INVENTORS
PER JOHAN LINDBERG
HANS GUNNAR MALMBERG

May 31, 1966 P. J. LINDBERG ETAL 3,253,498
SCANNING MECHANISM FOR ELECTROMAGNETIC RADIATION
Filed May 14, 1962 3 Sheets-Sheet 3
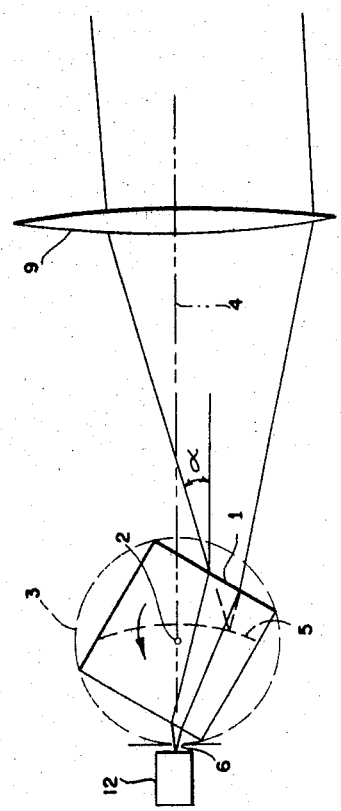
INVENTORS
PER JOHAN LINDBERG
HANS GUNNAR MALMBERG
BY *Larson and Taylor*
ATTORNEYS

United States Patent Office 3,253,498
Patented May 31, 1966

3,253,498
SCANNING MECHANISM FOR ELECTRO-
MAGNETIC RADIATION
Per Johan Lindberg, Stockholm, and Hans Gunnar Malmberg, Solna, Sweden, assignors to AGA Aktiebolaget, a corporation of Sweden
Filed May 14, 1962, Ser. No. 194,622
Claims priority, application Sweden, May 19, 1961, 5,299/61
2 Claims. (Cl. 88—1)

This invention relates to an improved optical-scanning mechanism for receiving electromagnetic radiation and to radiation-responsive means utilizing such optical scanning.

It is an object of the invention to provide improved optical-scanning means of the character indicated.

It is another object of the invention to provide improved means for continuously and automatically scanning of a field of view for ascertaining energy levels in such field.

It is a further object of the invention to provide means for optical-scanning of said field of view many times per second.

A further specific object is to provide means for more accurate and efficient scanning of a field of view, the "dead" or nonutilized scanning time being reduced to a small value.

Other objects and various further features of novelty and invention will be pointed out or will occur to those skilled in the art from a reading of the following specification, in conjunction with the accompanying drawings. Said drawings show the principle of the invention.

Figure 1:
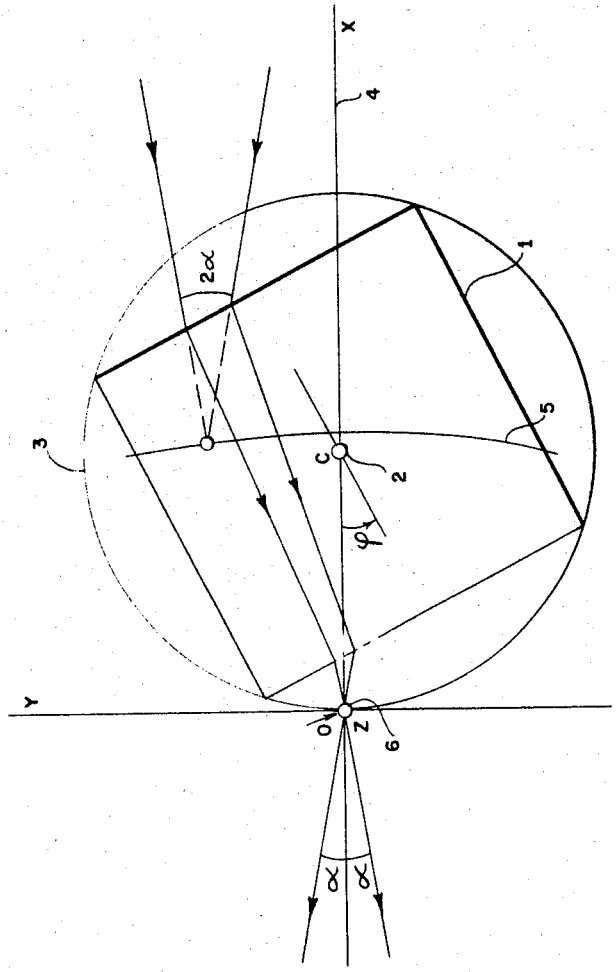
Figures 2, 3:
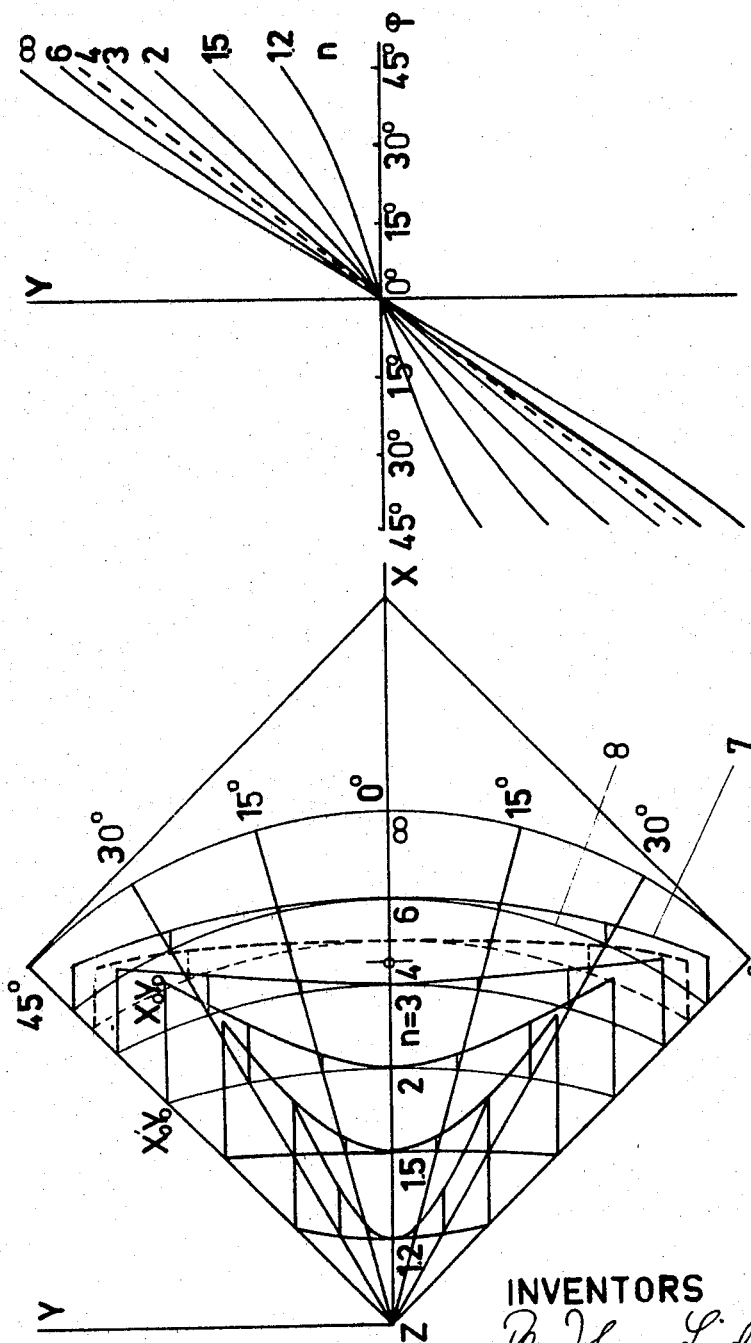

FIG. 1 is a side view of a scanning prism showing the deflected rays in said prism and the necessary image surface for proper focussing at the fixed scanning aperture, FIG. 2 is a diagram, which shows the scanning deflection as a function of the rotating angle of the prism for various indices of refraction of said prism, FIG. 3 is a view showing said paraxial image surface for rays in two mutually perpendicular planes for different indices of refraction of said prism, FIG. 4 is a side view showing the essential components of a complete scanning mechanism, and FIG. 5 is a perspective view of a particular form of a scanning prism.

Briefly stated, our invention is in the following specification characterized as an arrangement for scanning a field of view, where the incoming radiation is focused on a radiation-energy responsive element.

The main difficulty of scanning a field of view in a short time is of mechanical nature. Our invention uses a rotating refractive prism for scanning in one direction. Scanning in a direction essentially perpendicular to said direction is slower than in the first mentioned direction and is accomplished by other means, as by a nodding mirror in the collecting optics. Said slower scanning can also be accomplished by tilting the rotating axis of said prism. The resulting scanning pattern is like the pattern of common television.

Said prism can be rotated very rapidly according to our invention and several thousands of scans per second can be accomplished. In this way our invention allows complete scanning of said field of view many times per second exceeding the frame frequency of ordinary motion pictures.

Referring to the drawings the arrangement according to our invention is characterized by an image surface generated inside the circumscribed circle of said prism by a collecting optics 9 in FIGURE 4. Said prism is in our invention of the form of a plane parallel refractive prism, which is in one case 1 shown in FIG. 1. Said prism has in our invention an even number of sides and is rotated about an axis 2 as indicated by the arrow in FIG. 4, that is perpendicular to the paper in FIG. 1. The said collecting optics has an optical axis 4, that intersects said rotating axis 2 and is perpendicular thereto. The image surface 5 generated by said collecting optical system is situated inside said prism. Just outside the circle 3 generated by said rotating prism and on the optical axis 4 a scanning aperture 6 is located, through which a radiation passes to the radiation energy responsive element 12 such as a photocell, bolometer or the like, depending upon the energy spectrum of interest.

When said prism rotates, the scanning aperture 6 scans a line on said image surface 5 and when a corner of said prism passes the scanning aperture 6 there is a substantially instantaneous return of the scan.

In FIGS. 1 and 4 there is shown an incoming ray of radiation $\alpha$ having a maximum deviation from the direction of the optical axis. In FIG. 1 $\varphi$ designates the angle of rotation of the prism, and $x$, $y$ and $z$ are the axes of a coordinate system, $x$ being along the optical axis and $z$ parallel to the axis of rotation 2. A point on the image surface 5 is defined by these coordinates, as indicated in the case of a point $x$, $y$ in FIG. 1, the $z$ coordinate of which is 0, since it is in the $x$, $y$ plane.

The deflection of rays is shown in FIG. 2 in the $y$ direction as a function of the turning angle $\varphi$, and index of refraction of said prism $n$.

The axis $y$ in FIG. 3 refers to the same axis as in FIG. 2. FIG. 3 shows the necessary form (7 and 8) of the image surfaces of said optical system in order that said field of view shall be scanned without aberrations for various values of refractive index of said prism. Referring to FIG. 3 there are for every rotating angle $\varphi$ and every refractive index of said prism $n$, two values of $x$. The larger of said two values of $x$ corresponds to the image surface 7, that is generated by the rays in the plane of the paper i.e. the $x$, $y$ plane and forming small angles with the $x$-axis. The smaller value of $x$ corresponds to the image surface 8, that is generated by the rays, which are parallel with the $x$-$z$ plane and form small angles with the $x$-$y$ plane.

It is apparent from FIG. 3 that the aberrations, which are caused by the prism, can be neutralized to a substantial degree by a suitable choice of image surface. In this way it is possible according to our invention to achieve very high resolution in the optical scanning.

It is preferable if the refractive index of said prism has a value between 3 and 6 for the wave lengths used. Said index of refraction having a value of about 4 is specially advantageous both for yielding a linear scan and for allowing a relatively plane image surface. This is pointed out in FIG. 2 and FIG. 3. As is also shown in FIG. 2 a larger index of refraction of said prism gives a greater length of scan.

The material of said prism must in our invention be transparent for radiation in the energy spectrum of interest and it is preferable if the sides of said prism are coated with suitable material in order to reduce reflections.

The entry area of the rays coming from said optical system for varying turning angles $\varphi$ does not extend near the corners of the prism in our invention which may therefore be rounded. This improves both the air resistance and the mechanical strength of the prism.

When said prism rotates and the scanning in the other direction is accomplished in said collecting optics the radiation energy responsive element 12 scans said field of view for various energy levels in such field. The output signals from said element are amplified and filtered and may be used to modulate the intensity of a moving spot on a cathode ray tube. The movement of said spot is synchronized to the scanning in said two directions. In this way a complete picture is formed showing the distribution of radiation energy in said field of view.

We claim:

1. An optical scanning mechanism for receiving electromagnetic radiation comprising: a collecting optical system for creating a real image of the object to be scanned, a plane-parallel refractive prism of polygon shape having an even number of sides and adapted to rotate about an axis intersecting the optical axis of said collecting system, the refractive index of said prism having the value 4 for a predetermined range of wave lengths and the optical system being disposed so as to make the image surface thereof fall within said prism, there being an aperture for receiving the radiation from the object after passage through said prism and positioned on the optical axis close to said prism, and a radiation-responsive means for receiving the radiation passing through said aperture and for responding to said predetermined range of wavelengths.

2. An optical scanning mechanism as claimed in claim 1, in which said prism has rounded corners.

References Cited by the Examiner

UNITED STATES PATENTS

| | | | |
|---|---|---|---|
| 2,222,937 | 11/1940 | Dimmick | 178—7.6 |
| 2,298,045 | 10/1942 | Ehrenhaft | 88—16.8 |
| 2,967,246 | 1/1961 | Ostergren | 352—113 X |

FOREIGN PATENTS 895,914  11/1953  Germany.

OTHER REFERENCES

Loffler, "Optical Compensation by Polygonal Prism," British Kinematography, vol. 38, No. 3, March 1961, pages 61 to 69.

JEWELL H. PEDERSEN, *Primary Examiner.*

J. L. CHASKIN, R. L. WIBERT, *Assistant Examiners.*